(12) United States Patent
Aristarkhov et al.

(10) Patent No.: US 11,284,074 B2
(45) Date of Patent: Mar. 22, 2022

(54) CROSS-CHANNEL LOOK AHEAD RATE CONTROL FOR MULTI-CHANNEL VIDEO ENCODING

(71) Applicant: Intel Corporation, Santa Clara, CA (US)

(72) Inventors: Vasily Aristarkhov, Nizhny Novgorod (RU); Jason Tanner, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/722,497

(22) Filed: Dec. 20, 2019

(65) Prior Publication Data

US 2020/0128242 A1    Apr. 23, 2020

(51) Int. Cl.

| | | |
|---|---|---|
| *H04N 19/147* | (2014.01) | |
| *H04N 19/115* | (2014.01) | |
| *H04N 19/14* | (2014.01) | |
| *H04N 19/124* | (2014.01) | |
| *H04N 19/154* | (2014.01) | |
| *H04N 19/172* | (2014.01) | |

(52) U.S. Cl.
CPC ......... *H04N 19/115* (2014.11); *H04N 19/124* (2014.11); *H04N 19/14* (2014.11); *H04N 19/147* (2014.11); *H04N 19/154* (2014.11); *H04N 19/172* (2014.11)

(58) Field of Classification Search
CPC ... H04N 19/154; H04N 19/124; H04N 19/147
See application file for complete search history.

(56) References Cited

U.S. PATENT DOCUMENTS 5,805,220 A * 9/1998 Keesman ............. H04N 19/115
   348/382
6,219,358 B1 * 4/2001 Pinder ............. H04N 21/23611
   348/423.1

(Continued)

OTHER PUBLICATIONS

Multi-channel joint rate control of VBR mpeg encoded video for DBS appls; 1994; (Year: 1994).*

(Continued)

*Primary Examiner* — Luis Perez-Fuentes
(74) *Attorney, Agent, or Firm* — Hanley, Flight & Zimmerman, LLC

(57) ABSTRACT

Techniques are provided for multi-channel video encoding with cross-channel look ahead rate control. A methodology implementing the techniques according to an embodiment includes encoding a first video channel to generate a first output bitstream and first channel statistics including a quantization parameter, the first video channel comprising a first plurality of video frames at a first resolution. The method further includes encoding a second video channel to generate a second output bitstream encoded at a bit rate based on the first channel statistics, the second video channel comprising a second plurality of video frames at a second resolution. The second resolution may equal the first resolution depending on target bit rates for the channels. The method further includes performing look ahead processing on the first video channel to generate first channel look ahead statistics, and encoding the second video channel based on the first channel look ahead statistics.

20 Claims, 8 Drawing Sheets

(56) References Cited

U.S. PATENT DOCUMENTS

| | | | | |
|---|---|---|---|---|
| 7,570,827 | B2* | 8/2009 | Yang | H04N 19/147 |
| | | | | 382/245 |
| 8,238,444 | B2* | 8/2012 | Huang | H04N 19/147 |
| | | | | 375/240.27 |
| 8,326,067 | B2* | 12/2012 | Furbeck | H04N 19/147 |
| | | | | 382/250 |
| 8,331,441 | B2* | 12/2012 | Yang | H04N 19/147 |
| | | | | 375/240.03 |
| 8,406,286 | B2* | 3/2013 | Liu | H04N 19/593 |
| | | | | 375/240 |
| 8,879,635 | B2* | 11/2014 | Raveendran | H04N 5/21 |
| | | | | 375/240.24 |
| 9,118,944 | B2* | 8/2015 | Chou | H04N 19/147 |
| 9,491,475 | B2* | 11/2016 | Pearson | H04N 19/124 |
| 2002/0094031 | A1* | 7/2002 | Ngai | H04N 19/179 |
| | | | | 375/240.27 |
| 2008/0225945 | A1* | 9/2008 | Wu | H04N 19/17 |
| | | | | 375/240.03 |

OTHER PUBLICATIONS

Multiplexing of variable rate encoded streams; 1994; (Year: 1994).*
Joint rate control for multi-program video coding; Wang—1996; (Year: 1996).*
Statistical multiplexing using MPEG-2 video encoders; 2002; (Year: 2002).*

* cited by examiner

Encoding Timeline for Cross-Channel BRC
300

Channel 1
130

| Frame 1 302 | Frame 2 304 | Frame 3 306 | Frame 4 308 |

Channel 1 Statistics 138

Channel 2
140

| Frame 1 310 | Frame 2 312 | Frame 3 314 | Frame 4 316 |

Channel 2 Statistics 148

Channel 3
150

| Frame 1 320 | Frame 2 322 | Frame 3 324 | Frame 4 326 |

Time
(frame encoding duration)

FIG. 3

CROSS-CHANNEL LOOK AHEAD RATE CONTROL FOR MULTI-CHANNEL VIDEO ENCODING

BACKGROUND

Media content providers typically store the media content on a server at the highest quality resolution possible, which oftentimes is, for example, the resolution at which the content was originally created. The media content may then be provided to a consumer via a communications network, such as the Internet and the consumer's local area network. Some content providers store multiple instances of the video content being transcoded from the original sequence. For instance, a content provider may store multiple bit rates at 4 k resolution and multiple bit rates 1080p resolution, and may even use different encoding options to generate output for each resolution. However, and as will be appreciated in light of this disclosure, existing techniques for determining a suitable encoding bit rate can be computationally complex and inefficient.

BRIEF DESCRIPTION OF THE DRAWINGS

FIG. 3 illustrates an encoding timeline for cross-channel bit rate control (BRC), in accordance with certain embodiments of the present disclosure.

Figure 1:
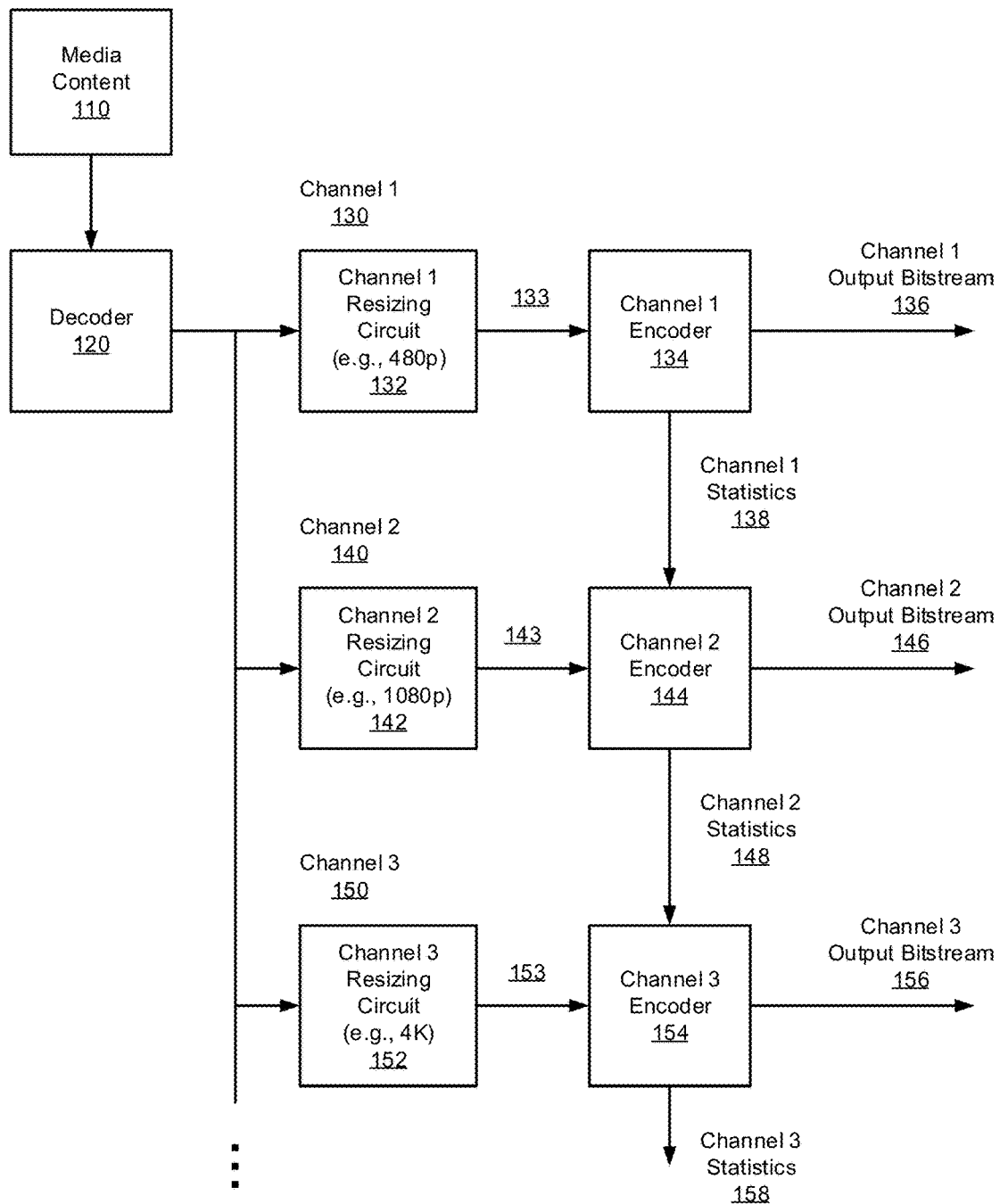
FIG. 1 is a block diagram of a multi-channel video encoding system with cross-channel bit rate control (BRC), configured in accordance with certain embodiments of the present disclosure.

Although the following Detailed Description will proceed with reference being made to illustrative embodiments, many alternatives, modifications, and variations thereof will be apparent in light of this disclosure.

DETAILED DESCRIPTION

Techniques are provided for multi-channel video encoding with cross-channel look ahead bit rate control. Although there are a number of advantages that will be appreciated in light of this disclosure, the techniques according to some embodiments provided herein allow for improved bit rate control relative to other techniques that, for instance, fail to take into account encoding parameters and resulted output from other encoding channels. In one such example embodiment, an encoding methodology includes encoding a first video channel to generate a first output bitstream and first channel statistics (e.g., a quantization parameter), and encoding a second video channel to generate a second output bitstream encoded at a bit rate based on the first channel statistics. The first video channel includes a first plurality of video frames at a first resolution, and the second video channel includes a second plurality of video frames at a second resolution, or at the same resolution but at a higher target bit rate. The video content of each of the first and second video channels comprises the same content (e.g., same movie), but with different encoding. In some such example embodiments, the encoding methodology further includes performing look ahead processing on the first video channel to generate first channel look ahead statistics, and then encoding the second video channel based on the first channel look ahead statistics. Thus, adaptive bit rate control is provisioned, by taking into account encoding parameters from other channels. Numerous variations will be appreciated in light of this disclosure.

General Overview

As previously noted, media content providers, such as video-on-demand services, typically store the media content at the highest quality resolution possible, which may be either used to create other instances of stored content having different resolutions and bitrates, or encoded into different channels at different resolutions and bitrates. In any case, the content provider can switch from one resolution and/or bitrate to another depending on available bandwidth in effort to maintain a quality viewing experience for the end user. Determining a level of quantization (e.g., a quantization parameter or QP) suitable to meet a targeted encoding bit rate can be a computationally complex problem. Existing techniques use a 2-pass encoding approach in which the first pass gathers statistics about frame complexity and temporal correlation for a given channel, and the second pass allocates a bit rate budget over the frames based on those statistics for that given channel. Using such techniques, the same data is processed twice, additional memory is required to buffer video frames, and extra latency is introduced. Moreover, such techniques fail to consider the input encoding parameters and resulted output from other encoding channels. Thus, because each encode is handled independently of other channels, existing techniques fail to recognize and exploit the fact that there are quality and rate control accuracy optimizations to be had by creating dependencies between the different resolution and/or bitrates.

To this end, an example embodiment of the present disclosure provides a methodology for adaptive bit rate control, by taking into account encoding parameters from other channels. In one such embodiment, the methodology provides improved bit rate control of multi-channel video encoding by exploiting the early availability of encoding statistics from lower resolution channels (or from channels at the same resolution but at a lower target bitrate) for use in the encoding of higher resolution channels (or from channels at the same resolution but at a higher target bitrate), which generally take longer to encode. This methodology allows for multiple encoding processes to be run concurrently on the same media content, to generate optimized rate control quantization parameters (i.e., greater quantization used to achieve lower bit rates) on a per frame basis which can be shared between channels to achieve bit rate targets.

The disclosed techniques can be implemented, for example, in a computing system or a software product executable or otherwise controllable by such systems, although other embodiments will be apparent. The system or product is configured to provide multi-channel video encoding with cross-channel look ahead processing for optimized bit rate control. In accordance with such an embodiment, a methodology to implement these techniques includes performing a resizing of media content to generate a first video channel comprising a first plurality of video frames at a first resolution and a second video channel comprising a second plurality of video frames at a second resolution. The method also includes encoding the first video channel to generate a first output bitstream and first channel statistics including a QP. The method further includes encoding the second video channel to generate a second output bitstream encoded at a bit rate based on the first channel statistics including the QP. The method further includes performing look ahead processing on the first video channel to generate first channel look ahead statistics, and encoding the second video channel based on the first channel look ahead statistics. The method further includes calculating a rate distortion (RD) curve and encoding a third video channel using a QP based on the slope of the RD curve, as will be described in greater detail below.

As will be appreciated, the techniques described herein may provide improved bit rate control for multi-channel video encoding using cross-channel statistic sharing and look ahead processing, compared to existing techniques that encode each channel independently and thus require two pass encoding on each channel for bit rate control. The disclosed techniques can be implemented on a broad range of platforms including workstations, laptops, tablets, and smartphones. These techniques may further be implemented in hardware or software or a combination thereof.

System Architecture

FIG. 1 is a block diagram of a multi-channel video encoding system 100 with cross-channel bit rate control, configured in accordance with certain embodiments of the present disclosure. The multi-channel video encoding system 100 is shown to include original media content 110, which may be stored or otherwise provided to the system, a decoder 120, channel resizing circuits 132, 142, 152, and channel encoders 134, 144, 154.

The media content 110 is original media content to be distributed to subscribers or other consumers, for example by a media service provider. The media content 110 may be stored on a server or other platform, or it may be provided through any suitable means. In some embodiments, the media content 110 may also be encoded in any suitable format, for example to reduce storage space. The media content 110 may generally be provided in a relatively high resolution format, such as the format in which it was originally recorded or created.

The decoder 120 is configured to decode the media content 110, for example, if it has been stored are provided in a coded format of any suitable type. The decoder 120 may use any suitable decoding process, based on the coded format, in light of the present disclosure.

The channel resizing circuits 132, 142, 152 are configured to resize the decoded media content to generate channels 130, 140, 150, respectively. The channels comprise a stream of video frames 133, 143, 153, respectively, at selected resolutions. For example, channel 1 may be resized to a 480p low resolution format, channel 2 may be resized to a 1080p medium resolution format, and channel 3 may be resized to a 4 k higher resolution format. Although only three channels are shown, it will be appreciated that any number of channels may be processed in accordance with the disclosed techniques to handle any desired combination of resolutions and target bit rates.

The channel encoders 134, 144, 154 are configured to encode the resized streams of video frames to generate output bitstreams 136, 146, 156 at a selected bit rate. Encoded bit rates correlate with encoded frame size, which is to say that higher bit rates correspond to larger frame sizes and lower bit rates correspond to smaller frame sizes. The encoders are also configured to generate channel statistics 138, 148, 158 and other information that can be employed by the encoders of other (generally higher resolution) channels to improve the encoding process, as will be explained in greater detail below.

Figure 2:
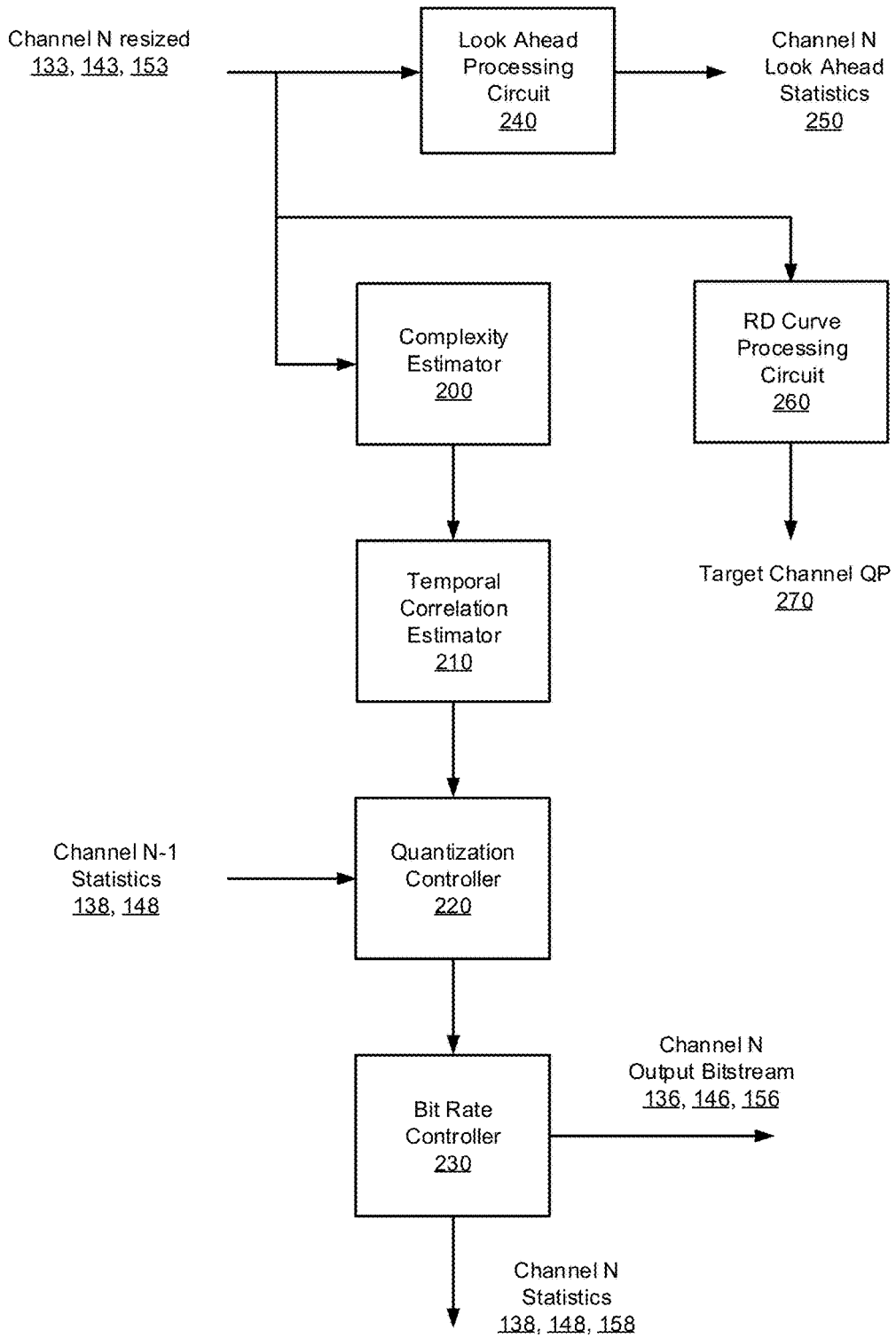
FIG. 2 is a block diagram of channel encoders, configured in accordance with certain embodiments of the present disclosure.

FIG. 2 is a block diagram of channel encoders 134, 144, 154, configured in accordance with certain embodiments of the present disclosure. The channel encoders are shown to include a complexity estimator 200, a temporal correlation estimator 210, a quantization controller 220, a bit rate controller 230, a look ahead processing circuit 240, and an RD curve processing circuit 250.

The complexity estimator 200 is configured to estimate the image complexity of the video frames of the resized channel and the temporal correlation estimator 210 is configured to estimate temporal correlation between frames. Video frames that have less complex image content and/or higher correlation between frames (e.g., less motion or action occurring between frames) can generally be encoded at lower bit rates. The ability to use lower bit rates improves bandwidth utilization and communication efficiency for delivery of media content to the consumer. These complexity and temporal correlation estimations may be performed using any suitable technique in light of the present disclosure.

The quantization controller 220 is configured to determine the degree of quantization (the QP) that can be applied in the encoding process to reduce the bit rate (and frame size) of the output bitstream. Greater quantization reduces the number of bits that need to be transmitted and therefore reduces the bit rate (and frame size). The QP determination may be based on the complexity estimation and the temporal correlation estimation performed on the given channel and/or on the channel statistics 138, 148, 158 provided by the encoders of other channels, as will be explained in greater detail below in connection with FIG. 3. The QP determination may also depend on the type of video frame. For example, if the frame has no dependencies on other frames (or just a one directional dependency) but it is used as a reference for subsequent frames, it would be advantageous to encode that frame at a higher bit rate (lower QP), particularly if it has a strong temporal correlation with the subsequent dependent frames.

The bit rate controller 230 is configured to perform the encoding, at a bit rate based at least in part on the QP, to generate the output bitstream 136, 146, 156, and to generate statistics 138, 148, 158 associated with the encoding process for use by other channel encoders. In some embodiments, the statistics may include one or more of the QP, the encoded frame size, the number of bits used to encode the frame at a given QP, and measures of frame complexity and temporal correlation. The video frames may be encoded into any desired format using any suitable technique in light of the present disclosure.

The look ahead processing circuit 240 is configured to perform look ahead processing of future video frames (relative to the current video frame) to generate look ahead statistics which may be provided for use by other encoder channels, as will be described in greater detail in connection with FIG. 4.

The curve processing circuit 260 is configured to calculate an RD curve. At a high level, the RD curve provides quality metrics of the encoded video channels as a function of the QP of the encoded video channel, for each frame. A new QP may then be determined for an additional encoded video channel, based on the slope of the RD curve, as will be explained in greater detail below in connection with FIG. 5.

FIG. 3 illustrates an encoding timeline 300 for cross-channel bit rate control, in accordance with certain embodiments of the present disclosure. As can be seen, video frames 302, 304, 306, 308, . . . , from channel 1 (a lower resolution channel), are encoded over a period of time. The time taken to encode the frames of channel 1 is generally shorter, as shown, than the time taken to encode the frames 310, 312, 314, 316, . . . of channel 2 (a higher resolution channel). Likewise, encoding the frames 320, 322, 324, 326, . . . of channel 3 (a still higher resolution channel) may take even longer, as shown. Thus, channel 1 statistics 138 may become available for use in processing of channels 2 and 3, and similarly, channel 2 statistics 148 may become available for use in the processing of channel 3.

For example, statistics from channel 1/frame 2 304 are ready in time for processing of channel 3/frame 2 322, although they are not ready in time for processing of channel 2/frame 2 312. As time proceeds, however, the processing requirements of the higher resolution channels accumulates and the possibilities for cross-channel sharing of statistics increases. Thus, as can be seen, statistics from channel 1/frame 3 306 are ready in time for processing of both channel 2/frame 3 314 and channel 3/frame 3 324.

Figure 4:
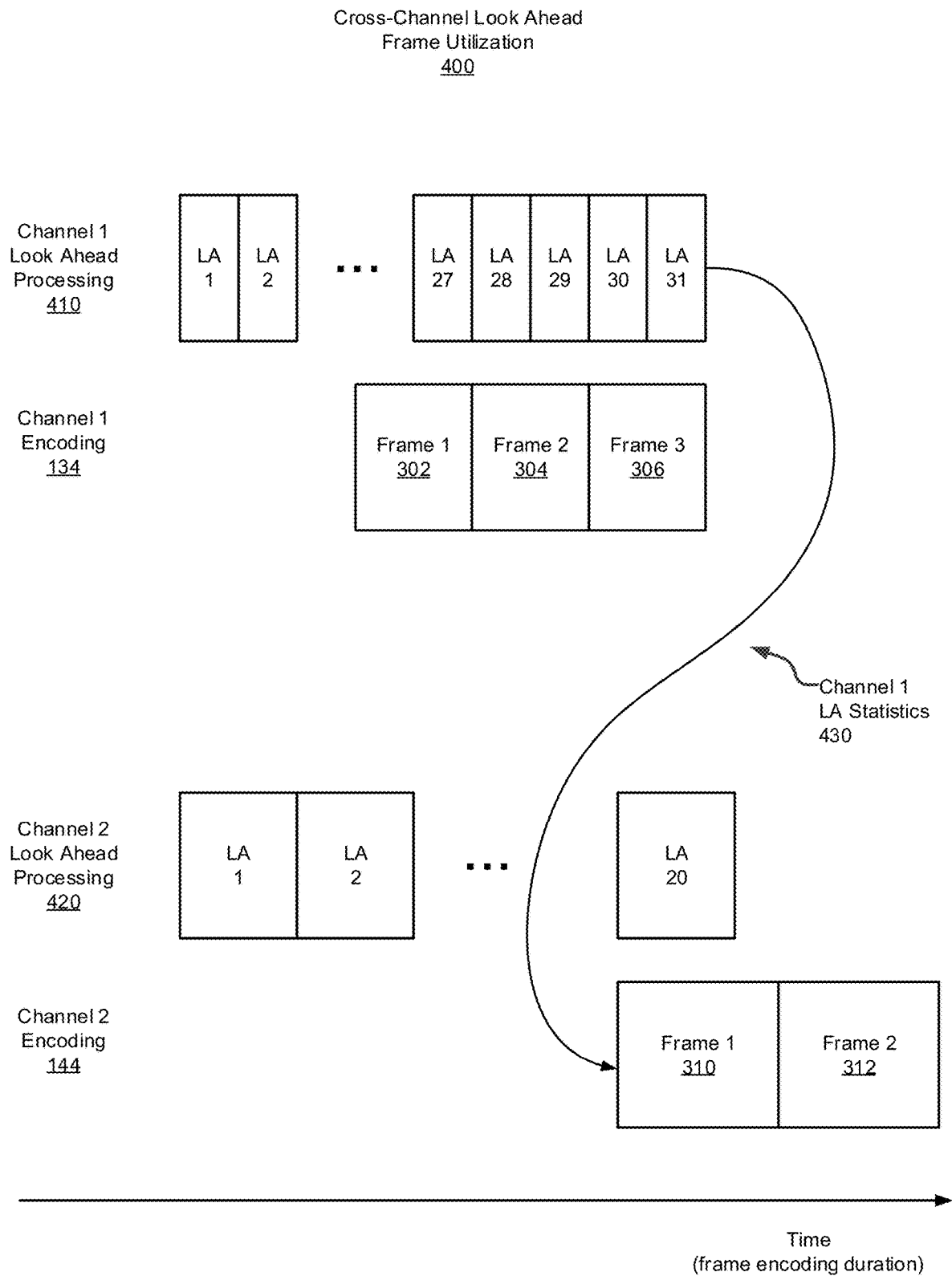
FIG. 4 illustrates cross-channel look ahead frame utilization, in accordance with certain embodiments of the present disclosure.

FIG. 4 illustrates cross-channel look ahead frame utilization 400, in accordance with certain embodiments of the present disclosure. In some embodiments, the encoders perform look ahead processing 410, 420 of future video frames to provide feedback to help determine how best to allocate a given bit rate budget over multiple frames. For example, if it can be determined that future video frames are going to increase in complexity and/or decrease in temporal correlation, it may be useful to decrease the bit rate of the current video frame to conserve the bit rate budget for future encoding. Conversely, if it can be determined that future video frames are going to decrease in complexity and/or increase in temporal correlation, it may be possible to increase the bit rate of the current video frame to enhance the video quality.

In general, increasing the number of look ahead frames provides greater accuracy rate control for bit allocation. Since the lower resolution channels perform look ahead processing (e.g., Channel 1 410) faster than the higher resolution channels (e.g., channel 2 420), it is possible to provide channel 1 look ahead statistics 430 to the channel 2 encoder 144, thus effectively increasing the number of look ahead frames available to channel 2. In some embodiments, look ahead statistics may include the QP and/or the frame size of the look ahead frame.

Figure 5:
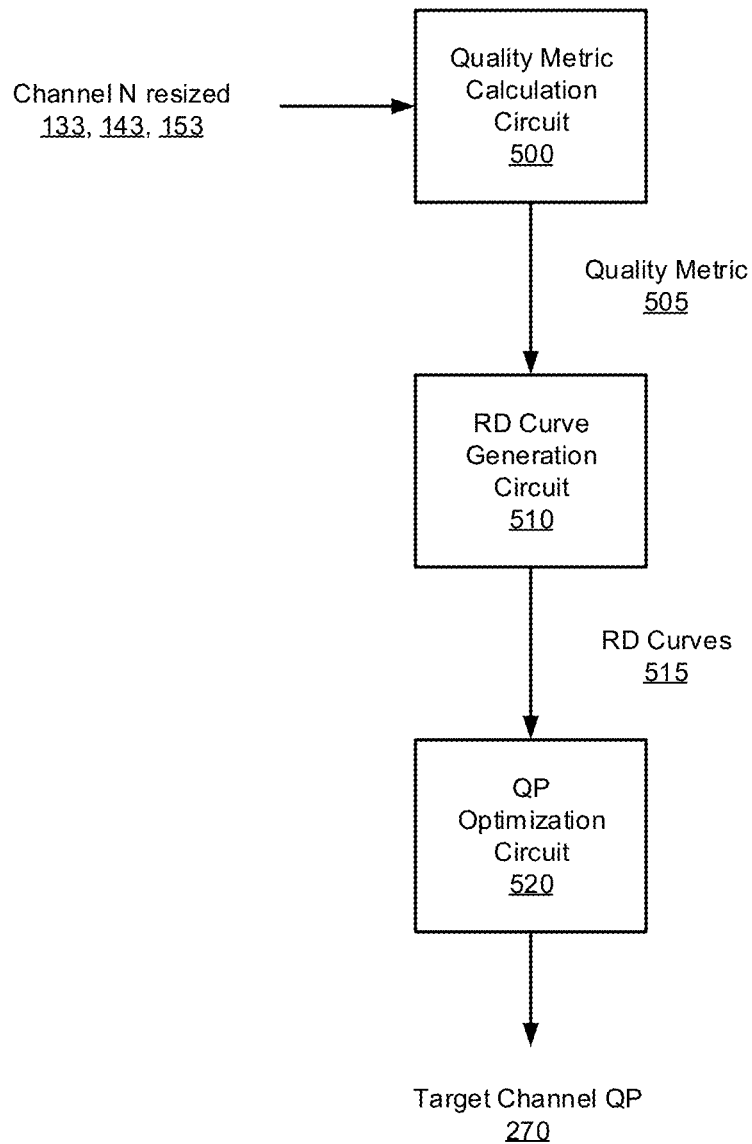
FIG. 5 is a block diagram of a rate distortion (RD) curve processing circuit, configured in accordance with certain embodiments of the present disclosure.
Figure 6:
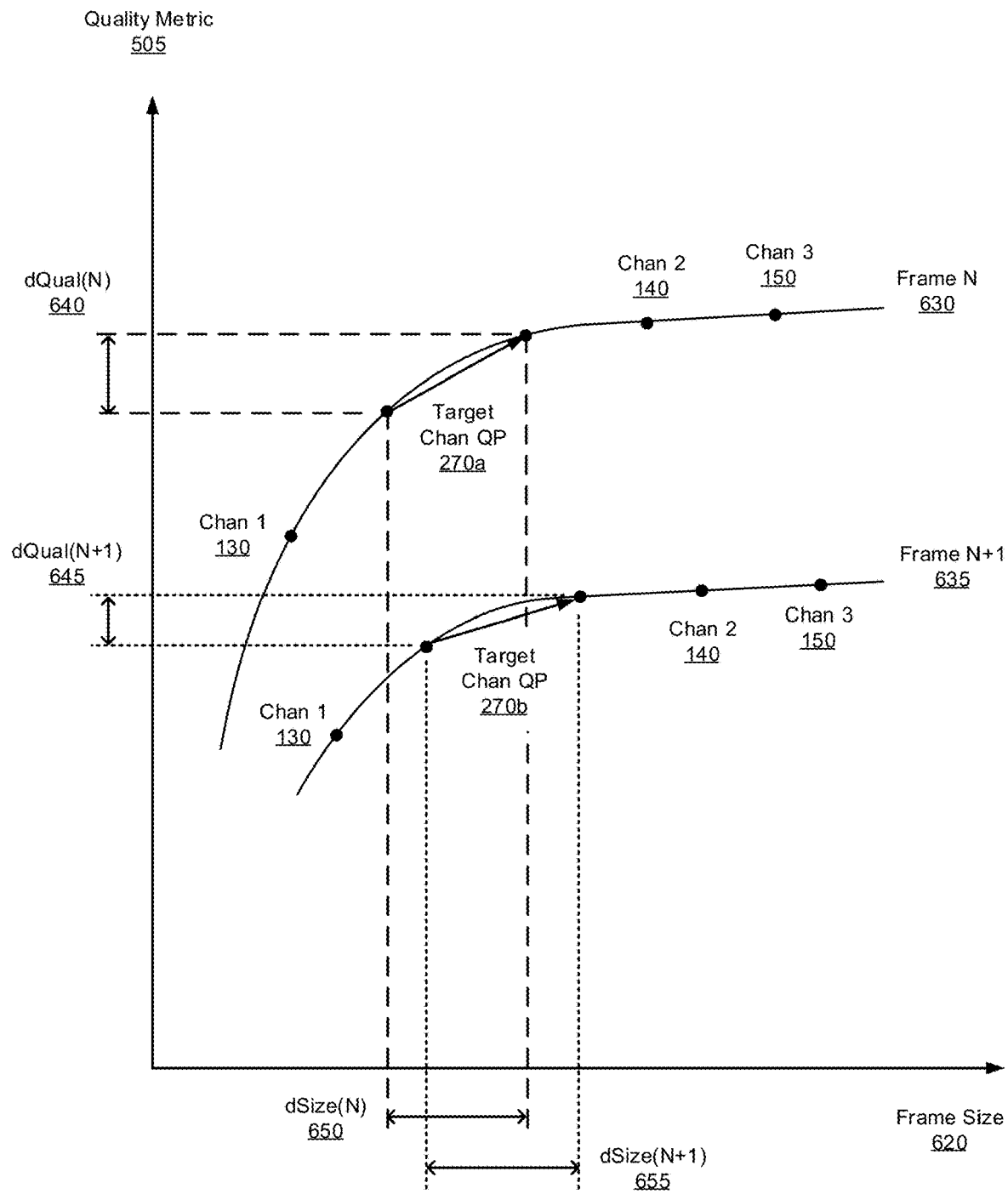
FIG. 6 illustrates a rate distortion (RD) curve, in accordance with certain embodiments of the present disclosure.

FIG. 5 is a block diagram of an RD curve processing circuit 240, configured in accordance with certain embodiments of the present disclosure. At a high-level, the RD curve processing circuit 240 generates RD curves 515, as illustrated in FIG. 6, and finds an optimal point on the curves that provide constant quality encoding while minimizing bits. The RD curve processing circuit 240 is shown to include a quality metric calculation circuit 500, and RD curve generation circuit 510, and a QP optimization circuit 520.

The quality metric calculation circuit 500 is configured to calculate a quality metric 505 as a function of frame size (which is related to the QP and the bit rate), for each channel and for each frame. In some embodiments, the quality metric may be calculated as a peak signal-to-noise ratio, a mean structural similarity index map, a video multimethod assessment fusion, or any other suitable metric in light of the present disclosure.

The RD curve generation circuit 510 is configured to generate RD curves 515 for each frame (e.g., frame N 630, frame N+1 635, . . . ), as illustrated in FIG. 6. Each curve provides the quality metric 505 obtained for each channel 130, 140, 150, at a given frame size 620 (or QP or bitrate). The region of each curve labeled target channel QP (270a, 270b), which is also referred to as the "knee of the curve," represents the optimal point for achieving the highest quality while utilizing the least number of encoding bits. For example, channel 2 140 achieves significantly higher quality than channel 1 130 due to the higher bitrate. Channel 3 150 uses an even higher bitrate than channel 2 140, but the quality gain is only marginal. The curves can be seen to vary for each frame as the quality/frame size trade-off for some frames is better than for others.

The QP optimization circuit 520 is configured to increase the average video stream quality of the encoders. In one such embodiment, the QP optimization circuit 520 accomplishes this increase by maximizing the following sum:

$$\sum_{n=0}^{All\,frames} \frac{dQuality_n}{dFrameSize_n} | Quality_n > \text{threshold}, FrameSize_n$$

where $dQuality_n$ is the change in quality metric for frame n given a change a change in frame size $dFrameSize_n$ for frame n, and threshold is a selected minimum quality threshold to be met for inclusion in the summation. Referring to FIG. 6, $dQuality_n$ is illustrated as 640 and 645, while $dFrameSize_n$ is illustrated as 650 and 655, for frames N and N+1 respectively.

Using the information from multiple channels with regard to the frame size (related to QP) and the change in quality and bitrate, encoding bits can be conserved from channels like channel 3, which can use a lower frame size (higher QP) with minimal impact on quality. This allows encoding bits to be preserved for future frames where the image content may require additional bits or simply allows a reduction in the bit rate to facilitate transmission where bandwidth may be limited.

Multi-channel encoding enables the use of RD curves from lower resolution channels to be used to project or predict points onto RD curves for higher resolution channels. The accuracy of that prediction can be refined frame to frame. Subsequent encoding at the same resolution can confirm the prediction and enable the selection of a QP which will provide a high quality while minimizing the bit rate. For example, if there are four encoding channels at a lower resolution of 720p (each encoding at different bit rates) and there are four encoding channels at a higher resolution of 1080p (each encoding at different bit rates), the lower resolution encoding channels will have already generated an RD curve for the relative quality and frame size (bit rate). The slope can be computed between each point on the RD curve and the higher resolution channel encoding can use that information as a proxy RD curve. After encoding of the two lowest bit rate higher resolution channels, the slope can be checked as well as the accuracy of the QP selection with predicted quality and bit consumption. The next higher bit rate frame can use that information to select a new QP to either minimize bits spent or to achieve higher quality by calculating the slope and determining where the curve flattens (i.e., where increased bits do not significantly improve quality).

Methodology

Figure 7:
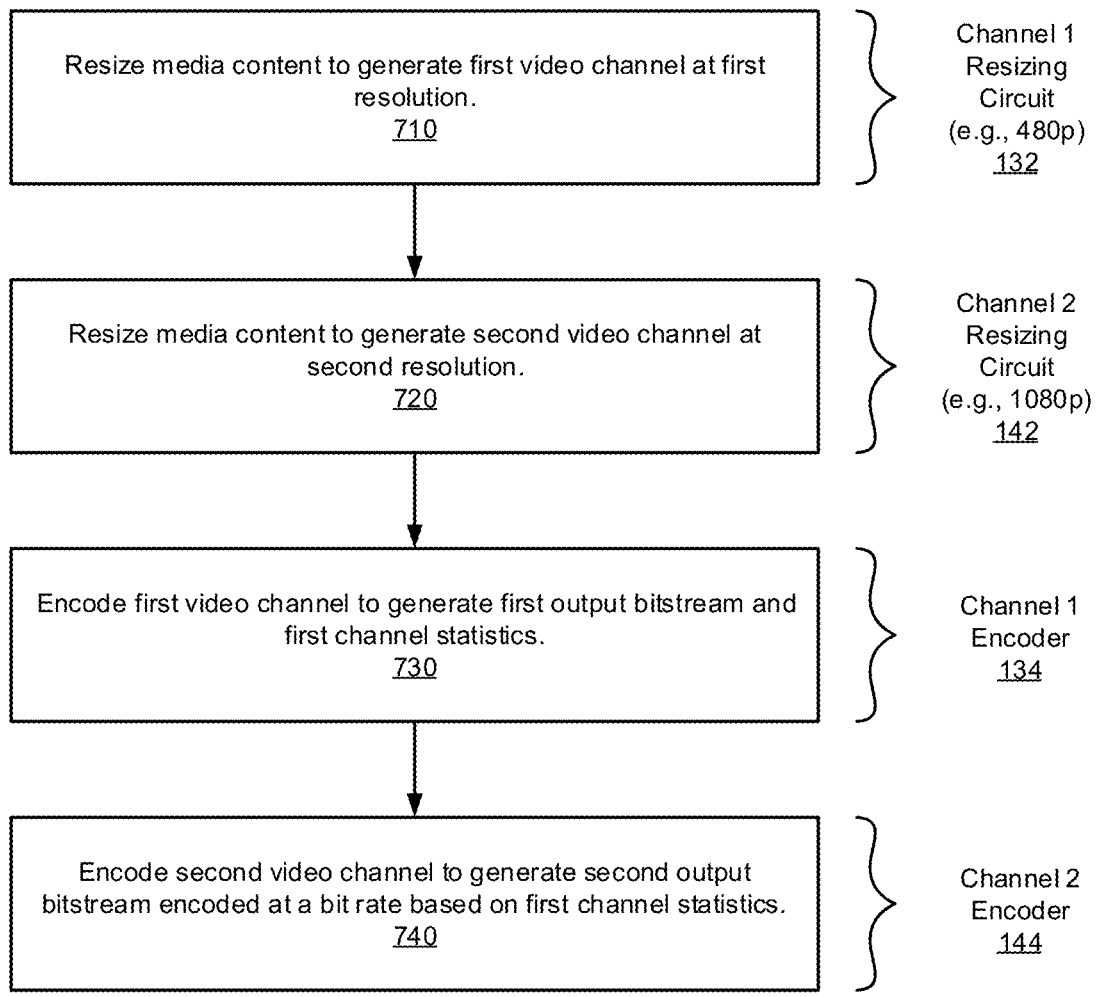
FIG. 7 is a flowchart illustrating a methodology for performing multi-channel video encoding with cross-channel bit rate control, in accordance with certain embodiments of the present disclosure.

FIG. 7 is a flowchart illustrating an example method 700 for performing multi-channel video encoding with cross-channel bit rate control, in accordance with certain embodiments of the present disclosure. As can be seen, the example method includes a number of phases and sub-processes, the sequence of which may vary from one embodiment to another. However, when considered in the aggregate, these phases and sub-processes form a process bit rate control of multi-channel video encoding, in accordance with certain of the embodiments disclosed herein. These embodiments can be implemented, for example, using the system architecture illustrated in FIGS. 1-6, as described above. However other system architectures can be used in other embodiments, as will be apparent in light of this disclosure. To this end, the correlation of the various functions shown in FIG. 7 to the specific components illustrated in the other figures is not intended to imply any structural and/or use limitations. Rather, other embodiments may include, for example, varying degrees of integration wherein multiple functionalities are effectively performed by one system. For example, in an alternative embodiment a single module having decoupled sub-modules can be used to perform all of the functions of method 700. Thus, other embodiments may have fewer or more modules and/or sub-modules depending on the granularity of implementation. In still other embodiments, the methodology depicted can be implemented as a computer program product including one or more non-transitory machine-readable mediums that when executed by one or more processors cause the methodology to be carried out. Numerous variations and alternative configurations will be apparent in light of this disclosure.

As illustrated in FIG. 7, in an embodiment, method 700 for multi-channel video encoding with cross-channel bit rate control commences by resizing, at operation 710, media content to generate a first video channel comprising a first plurality of video frames at a first resolution.

Next, at operation 720, a second resizing of the media content is performed to generate a second video channel comprising a second plurality of video frames at a second resolution. The second resolution may be greater than the first resolution and/or the target bit rate of the first video channel may be less than the target bit rate for the second video channel.

At operation 730, the first video channel is encoded to generate a first output bitstream and first channel statistics. In some embodiments, the encoding of the first video channel is based on a complexity estimation and a temporal correlation estimation of the first plurality of video frames. In some embodiments, the first channel statistics include a QP.

At operation 740, the second video channel to generate a second output bitstream, the second output bitstream encoded at a bit rate based on the first channel statistics, which may include the QP.

It will be appreciated that the process may be extended to resizing and encoding of any additional number of channels at any desired resolutions, by providing statistics from lower resolution channel encoding to higher resolution channel encoding.

Of course, in some embodiments, additional operations may be performed, as previously described in connection with the system. For example, look ahead processing may be performed on the first video channel to generate first channel look ahead statistics, and the encoding of the second video channel may then be based on the first channel look ahead statistics.

In some embodiments, an RD curve may be calculated, the RD curve providing a quality metric of the encoded first video channel as a function of a QP of the encoded first video channel, and a quality metric of the encoded second video channel as a function of a QP of the encoded second video channel. The QP of an encoded third video channel may then be based on a slope of the RD curve, as previously described.

Example System

Figure 8:
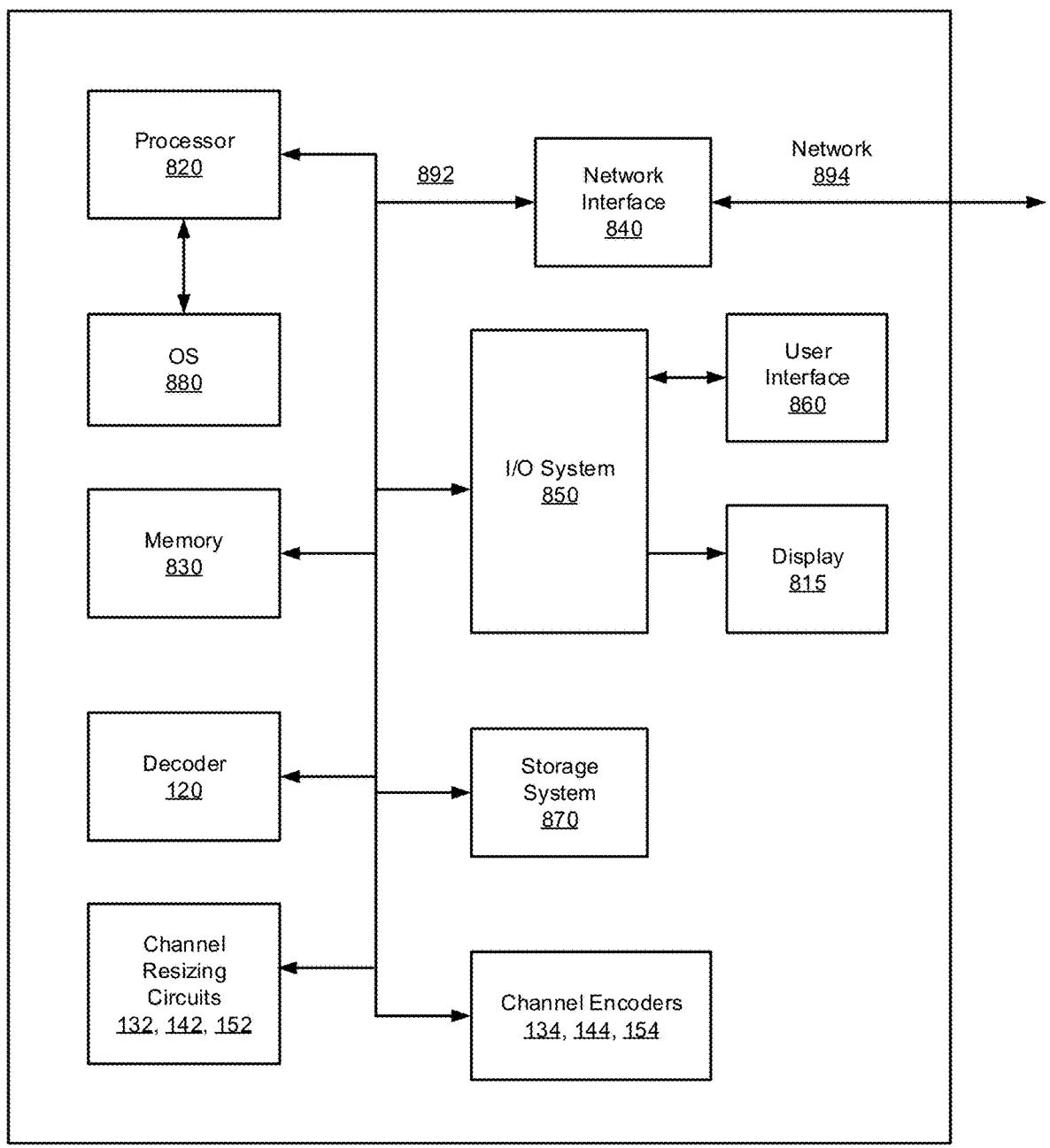
FIG. 8 is a block diagram schematically illustrating a computing platform configured to perform multi-channel video encoding with cross-channel bit rate control, in accordance with certain embodiments of the present disclosure.

FIG. 8 is a block diagram schematically illustrating a computing platform configured to perform multi-channel video encoding with bit cross-channel rate control, in accordance with certain embodiments of the present disclosure. In some embodiments, platform 800 may be hosted on, or otherwise be incorporated into a personal computer, workstation, server system, laptop computer, ultra-laptop computer, tablet, touchpad, portable computer, handheld computer, palmtop computer, personal digital assistant (PDA), cellular telephone, combination cellular telephone and PDA, smart device (for example, smartphone, smart-speaker, or smart-tablet), mobile internet device (MID), messaging device, data communication device, wearable device, embedded system, and so forth. Any combination of different devices may be used in certain embodiments.

In some embodiments, platform 800 may comprise any combination of a processor 820, a memory 830, decoder 120, channel resizing circuits 132, 142, 152, channel encoders 134, 144, 154, a network interface 840, an input/output (I/O) system 850, a user interface 860, a display element 815, and a storage system 870. As can be further seen, a bus and/or interconnect 892 is also provided to allow for communication between the various components listed above and/or other components not shown. Platform 800 can be coupled to a network 894 through network interface 840 to allow for communications with other computing devices, platforms, devices to be controlled, or other resources. Other componentry and functionality not reflected in the block diagram of FIG. 8 will be apparent in light of this disclosure, and it will be appreciated that other embodiments are not limited to any particular hardware configuration.

Processor 820 can be any suitable processor, and may include one or more coprocessors or controllers, such as an audio processor, a graphics processing unit, or hardware accelerator, to assist in control and processing operations associated with platform 800. In some embodiments, the processor 820 may be implemented as any number of processor cores. The processor (or processor cores) may be any type of processor, such as, for example, a microprocessor, an embedded processor, a digital signal processor (DSP), a graphics processor (GPU), a tensor processing unit (TPU), a network processor, a field programmable gate array or other device configured to execute code. The processors may be multithreaded cores in that they may include more than one hardware thread context (or "logical processor") per core. Processor 820 may be implemented as a complex instruction set computer (CISC) or a reduced instruction set computer (RISC) processor. In some embodiments, processor 820 may be configured as an x86 instruction set compatible processor.

Memory 830 can be implemented using any suitable type of digital storage including, for example, flash memory and/or random-access memory (RAM). In some embodiments, the memory 830 may include various layers of memory hierarchy and/or memory caches as are known to those of skill in the art. Memory 830 may be implemented as a volatile memory device such as, but not limited to, a RAM, dynamic RAM (DRAM), or static RAM (SRAM) device. Storage system 870 may be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device. In some embodiments, storage 870 may comprise technology to increase the storage performance enhanced protection for valuable digital media when multiple hard drives are included.

Processor 820 may be configured to execute an Operating System (OS) 880 which may comprise any suitable operating system, such as Google Android (Google Inc., Mountain View, Calif.), Microsoft Windows (Microsoft Corp., Redmond, Wash.), Apple OS X (Apple Inc., Cupertino, Calif.), Linux, or a real-time operating system (RTOS). As will be appreciated in light of this disclosure, the techniques provided herein can be implemented without regard to the particular operating system provided in conjunction with platform 800, and therefore may also be implemented using any suitable existing or subsequently-developed platform.

Network interface circuit 840 can be any appropriate network chip or chipset which allows for wired and/or wireless connection between other components of device platform 800 and/or network 894, thereby enabling platform 800 to communicate with other local and/or remote computing systems, servers, cloud-based servers, and/or other resources. Wired communication may conform to existing (or yet to be developed) standards, such as, for example, Ethernet. Wireless communication may conform to existing (or yet to be developed) standards, such as, for example, cellular communications including LTE (Long Term Evolution) and 5G, Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 850 may be configured to interface between various I/O devices and other components of device platform 800. I/O devices may include, but not be limited to, user interface 860, and display element 815. User interface 860 may include devices (not shown) such as a microphone, touchpad, keyboard, and mouse, etc. I/O system 850 may include a graphics subsystem configured to perform processing of images for rendering on the display element. Graphics subsystem may be a graphics processing unit or a visual processing unit (VPU), for example. An analog or digital interface may be used to communicatively couple graphics subsystem and the display element. For example, the interface may be any of a high definition multimedia interface (HDMI), DisplayPort, wireless HDMI, and/or any other suitable interface using wireless high definition compliant techniques. In some embodiments, the graphics subsystem could be integrated into processor 820 or any chipset of platform 800.

It will be appreciated that in some embodiments, the various components of platform 800 may be combined or integrated in a system-on-a-chip (SoC) architecture. In some embodiments, the components may be hardware components, firmware components, software components or any suitable combination of hardware, firmware or software.

Decoder 120, channel resizing circuits 132, 142, 152, and channel encoders 134, 144, 154 are configured to perform multi-channel video encoding with cross-channel look ahead processing for optimized bit rate control, as described previously. Channel encoders 134, 144, 154 may include any or all of the circuits/components illustrated in FIGS. 2 and 5, as described above. These components can be implemented or otherwise used in conjunction with a variety of suitable software and/or hardware that is coupled to or that otherwise forms a part of platform 800. These components can additionally or alternatively be implemented or otherwise used in conjunction with user I/O devices that are capable of providing information to, and receiving information and commands from, a user.

In some embodiments, these circuits may be installed local to platform 800, as shown in the example embodiment of FIG. 8. Alternatively, platform 800 can be implemented in a client-server arrangement wherein at least some functionality associated with these circuits is provided to platform 800 using an applet, such as a JavaScript applet, or other downloadable module or set of sub-modules. Such remotely accessible modules or sub-modules can be provisioned in real-time, in response to a request from a client computing system for access to a given server having resources that are of interest to the user of the client computing system. In such embodiments, the server can be local to network 894 or remotely coupled to network 894 by one or more other networks and/or communication channels. In some cases, access to resources on a given network or computing system may require credentials such as usernames, passwords, and/or compliance with any other suitable security mechanism.

In various embodiments, platform 800 may be implemented as a wireless system, a wired system, or a combination of both. When implemented as a wireless system, platform 800 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, platform 800 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, cause one or more of the methodologies disclosed herein to be implemented. The instructions can be encoded using a suitable programming language, such as C, C++, object oriented C, Java, JavaScript, Visual Basic .NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology. For instance, in certain embodiments, the system may leverage processing resources provided by a remote computer system accessible via network 894. The computer software applications disclosed herein may include any number of different modules, sub-modules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other embodiments are not limited to any particular hardware or software configuration. Thus, in other embodiments platform 800 may comprise additional, fewer, or alternative subcomponents as compared to those included in the example embodiment of FIG. 8.

The aforementioned non-transitory computer readable medium may be any suitable medium for storing digital information, such as a hard drive, a server, a flash memory, and/or random-access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method, process, and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CD-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical entities within the registers, memory units, or other such information storage transmission or displays of the computer system. The embodiments are not limited in this context.

The terms "circuit" or "circuitry," as used in any embodiment herein, are functional and may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system-on-a-chip (SoC), desktop computers, laptop computers, tablet computers, servers, smartphones, etc. Other embodiments may be implemented as software executed by a programmable control device. In such cases, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

Example 1 is a processor-implemented method for rate control of multi-channel video encoding, the method comprising: encoding, by the processor-based system, a first video channel to generate a first output bitstream and first channel statistics, the first video channel comprising a first plurality of video frames at a first resolution; and encoding, by the processor-based system, a second video channel to generate a second output bitstream, the second video channel comprising a second plurality of video frames at a second resolution, the second output bitstream encoded at a bit rate based on the first channel statistics.

Example 2 includes the subject matter of Example 1, wherein the second resolution is greater than the first resolution, or the second resolution is less than or equal to the first resolution and a target bit rate of the first video channel is less than a target bit rate for the second video channel.

Example 3 includes the subject matter of Examples 1 or 2, wherein the encoding of the first video channel is based on an estimation of image complexity of the first plurality of video frames and on an estimation of temporal correlation between frames of the first plurality of video frames.

Example 4 includes the subject matter of any of Examples 1-3, wherein the first channel statistics include a quantization parameter (QP) to determine a degree of quantization of bits that can be applied in the encoding process to reduce the bit rate, and the second output bitstream is encoded at a bit rate based on the QP.

Example 5 includes the subject matter of any of Examples 1-4, further comprising performing look ahead processing on the first video channel to generate first channel look ahead statistics, and encoding the second video channel based on the first channel look ahead statistics, wherein the look ahead statistics include quantization parameters (QPs) of the first plurality of video frames.

Example 6 includes the subject matter of any of Examples 1-5, further comprising: calculating a rate distortion (RD) curve, the RD curve providing a quality metric of the encoded first video channel as a function of a quantization parameter (QP) of the encoded first video channel, and a quality metric of the encoded second video channel as a function of a QP of the encoded second video channel; and determining a QP of an encoded third video channel based on a slope of the RD curve.

Example 7 includes the subject matter of any of Examples 1-6, wherein prior to the encoding, the method further comprises: performing, by the processor-based system, a first resizing of media content to generate the first video channel; and performing, by the processor-based system, a second resizing of the media content to generate the second video channel.

Example 8 is at least one non-transitory computer readable storage medium having instructions encoded thereon that, when executed by one or more processors, cause a process to be carried out for rate control of multi-channel video encoding, the process comprising: encoding a first video channel to generate a first output bitstream and first channel statistics, the first video channel comprising a first plurality of video frames at a first resolution; and encoding a second video channel to generate a second output bitstream, the second video channel comprising a second plurality of video frames at a second resolution, the second output bitstream encoded at a bit rate based on the first channel statistics.

Example 9 includes the subject matter of Example 8, wherein the second resolution is greater than the first resolution, or the second resolution is less than or equal to the first resolution and a target bit rate of the first video channel is less than a target bit rate for the second video channel.

Example 10 includes the subject matter of Examples 8 or 9, wherein the encoding of the first video channel is based on an estimation of image complexity of the first plurality of video frames and on an estimation of temporal correlation between frames of the first plurality of video frames.

Example 11 includes the subject matter of any of Examples 8-10, wherein the first channel statistics include a quantization parameter (QP) to determine a degree of quantization of bits that can be applied in the encoding process to reduce the bit rate, and the second output bitstream is encoded at a bit rate based on the QP.

Example 12 includes the subject matter of any of Examples 8-11, wherein the process further comprises performing look ahead processing on the first video channel to generate first channel look ahead statistics, and encoding the second video channel based on the first channel look ahead statistics, wherein the look ahead statistics include quantization parameters (QPs) of the first plurality of video frames.

Example 13 includes the subject matter of any of Examples 8-12, wherein the process further comprises: calculating a rate distortion (RD) curve, the RD curve providing a quality metric of the encoded first video channel as a function of a quantization parameter (QP) of the encoded first video channel, and a quality metric of the encoded second video channel as a function of a QP of the encoded second video channel; and determining a QP of an encoded third video channel based on a slope of the RD curve.

Example 14 includes the subject matter of any of Examples 8-13, wherein prior to the encoding, the process further comprises: performing a first resizing of media content to generate the first video channel; and performing, a second resizing of the media content to generate the second video channel.

Example 15 is a system for multi-channel video encoding rate control, the system comprising: a first resizing circuit to resize media content to generate a first video channel comprising a first plurality of video frames at a first resolution; a second resizing circuit to resize the media content to generate a second video channel comprising a second plurality of video frames at a second resolution; a first encoder to encode the first video channel to generate a first output bitstream and first channel statistics; and a second encoder to encode the second video channel to generate a second output bitstream, the second output bitstream encoded at a bit rate based on the first channel statistics.

Example 16 includes the subject matter of Example 15, wherein the second resolution is greater than the first resolution, or the second resolution is less than or equal to the first resolution and a target bit rate of the first video channel is less than a target bit rate for the second video channel.

Example 17 includes the subject matter of Examples 15 or 16, further comprising a complexity estimator and a temporal correlation estimator to encode the first video channel based on a complexity estimation and a temporal correlation estimation of the first plurality of video frames.

Example 18 includes the subject matter of any of Examples 15-17, wherein the first channel statistics include a quantization parameter (QP) and the second output bitstream is encoded at a bit rate based on the QP.

Example 19 includes the subject matter of any of Examples 15-18, further comprising a look ahead processing circuit to perform look ahead processing on the first video channel to generate first channel look ahead statistics, wherein the second encoder is to encode the second video channel based on the first channel look ahead statistics.

Example 20 includes the subject matter of any of Examples 15-19, further comprising a rate distortion (RD) curve processing circuit to calculate an RD curve, the RD curve providing a quality metric of the encoded first video channel as a function of a QP of the encoded first video channel, and a quality metric of the encoded second video channel as a function of a QP of the encoded second video channel, wherein the RD curve processing circuit is further to determine a QP of an encoded third video channel based on a slope of the RD curve.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not by this detailed description, but rather by the claims appended hereto. Future filed applications claiming priority to this application may claim the disclosed subject matter in a different manner, and may generally include any set of one or more elements as various disclosed or otherwise demonstrated herein.

What is claimed is:

1. A method for rate control of multi-channel video encoding, the method comprising:
   encoding, by a processor-based system, a first video channel to generate a first output bitstream and first channel statistics, the first video channel including a first plurality of video frames at a first resolution;
   encoding, by the processor-based system, a second video channel to generate a second output bitstream, the second video channel including a second plurality of video frames at a second resolution, the second output bitstream encoded based on the first channel statistics;
   calculating, by the processor-based system, a rate distortion (RD) curve, the RD curve to provide (i) a first quality metric of the encoded first video channel as a function of a first quantization parameter (QP) of the encoded first video channel, and (ii) a second quality metric of the encoded second video channel as a function of a second QP of the encoded second video channel; and
   determining, by the processor-based system, a third QP to encode a third video channel, the third QP determined based on a slope of the RD curve.

2. The method of claim 1, wherein the second resolution is greater than the first resolution, or the second resolution is less than or equal to the first resolution and a first target bit rate of the first video channel is less than a second target bit rate for the second video channel.

3. The method of claim 1, wherein the encoding of the first video channel is based on an estimation of image complexity of the first plurality of video frames and on an estimation of temporal correlation between frames of the first plurality of video frames.

4. The method of claim 1, wherein the first channel statistics include the first QP, and the second output bitstream is encoded at a bit rate based on the first QP.

5. The method of claim 1, wherein the method further comprises:
   performing, prior to the encoding of the first video channel, a first resizing of media content to generate the first video channel; and
   performing, prior to the encoding of the second video channel, a second resizing of the media content to generate the second video channel.

6. At least one non-transitory computer readable storage medium comprising instructions that, when executed, cause one or more processors to at least:
   encode a first video channel to generate a first output bitstream and first channel statistics, the first video channel comprising a first plurality of video frames at a first resolution;
   encode a second video channel to generate a second output bitstream, the second video channel comprising a second plurality of video frames at a second resolution, the second output bitstream encoded based on the first channel statistics;
   calculate a rate distortion (RD) curve, the RD curve to provide (i) a first quality metric of the encoded first video channel as a function of a first quantization parameter (QP) of the encoded first video channel, and (ii) a second quality metric of the encoded second video channel as a function of a second QP of the encoded second video channel; and determine a third QP to encode a third video channel, the third QP determined based on a slope of the RD curve.

7. The computer readable storage medium of claim 6, wherein the second resolution is greater than the first resolution, or the second resolution is less than or equal to the first resolution and a first target bit rate of the first video channel is less than a second target bit rate for the second video channel.

8. The computer readable storage medium of claim 6, wherein the instructions cause the one or more processors to encode the first video channel based on an estimation of image complexity of the first plurality of video frames and on an estimation of temporal correlation between frames of the first plurality of video frames.

9. The computer readable storage medium of claim 6, wherein the first channel statistics include the first QP, and the second output bitstream is encoded at a bit rate based on the first QP.

10. The computer readable storage medium of claim 6, wherein the instructions cause the one or more processors to:
perform, prior to the first video channel being encoded, a first resizing of media content to generate the first video channel; and
perform, prior to the second video channel being encoded, a second resizing of the media content to generate the second video channel.

11. An apparatus for multi-channel video encoding rate control, the system comprising:
at least one memory;
instructions in the apparatus; and
processor circuitry to execute the instructions to at least:
resize media content to generate a first video channel, the first video channel including a first plurality of video frames at a first resolution;
resize the media content to generate a second video channel, the second video channel including a second plurality of video frames at a second resolution;
encode the first video channel to generate a first output bitstream and first channel statistics; and
encode the second video channel to generate a second output bitstream, the second output bitstream encoded based on the first channel statistics;
calculate a rate distortion (RD) curve, the RD curve to provide (i) a first quality metric of the encoded first video channel as a function of a first quantization parameter (QP) of the encoded first video channel, and (ii) a second quality metric of the encoded second video channel as a function of a second QP of the encoded second video channel; and
determine a third QP to encode a third video channel, the third QP determined based on a slope of the RD curve.

12. The apparatus of claim 11, wherein the second resolution is greater than the first resolution, or the second resolution is less than or equal to the first resolution and a first target bit rate of the first video channel is less than a second target bit rate for the second video channel.

13. The apparatus of claim 11, wherein the processor circuitry is to encode the first video channel based on a complexity estimation and a temporal correlation estimation of the first plurality of video frames.

14. The apparatus of claim 11, wherein the first channel statistics include a quantization parameter (QP) the first QP, and the second output bitstream is encoded at a bit rate based on the QP.

15. The method of claim 1, wherein the third video channel includes a third plurality of video frames at a third resolution, and further including encoding the third video channel based on the third QP to generate a third output bitstream.

16. The method of claim 1, wherein the first channel statistics are associated with first ones of the first plurality of video frames corresponding to a first period, and the encoding of the second video channel includes encoding second ones of the second plurality of video frames based on the first channel statistics, the second ones of the second plurality of video frames associated with a second time period after the first period.

17. The computer readable storage medium of claim 6, wherein the third video channel includes a third plurality of video frames at a third resolution, and the instructions cause the one or more processors to encode the third video channel based on the third QP to generate a third output bitstream.

18. The computer readable storage medium of claim 6, wherein the first channel statistics are associated with first ones of the first plurality of video frames corresponding to a first period, and the instructions cause the one or more processors to encode second ones of the second plurality of video frames based on the first channel statistics, the second ones of the second plurality of video frames associated with a second time period after the first period.

19. The apparatus of claim 11, wherein the third video channel includes a third plurality of video frames at a third resolution, and the processor circuitry is to encode the third video channel based on the third QP to generate a third output bitstream.

20. The apparatus of claim 11, wherein the first channel statistics are associated with first ones of the first plurality of video frames corresponding to a first period, and the processor circuitry is to encode second ones of the second plurality of video frames based on the first channel statistics, the second ones of the second plurality of video frames associated with a second time period after the first period.

* * * * *